United States Patent
Coulon et al.

(10) Patent No.: US 8,282,989 B2
(45) Date of Patent: Oct. 9, 2012

(54) METHOD FOR MANUFACTURING AN ASSEMBLY FOR A FUEL CELL

(75) Inventors: Nadine Coulon, Montrouge (FR); Sophie Giraud, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 1065 days.

(21) Appl. No.: 11/793,894

(22) PCT Filed: Dec. 20, 2005

(86) PCT No.: PCT/FR2005/051112
§ 371 (c)(1), (2), (4) Date: Jun. 21, 2007

(87) PCT Pub. No.: WO2006/070150
PCT Pub. Date: Jul. 6, 2006

(65) Prior Publication Data
US 2008/0008826 A1 Jan. 10, 2008

(30) Foreign Application Priority Data
Dec. 23, 2004 (FR) ..................... 04 53212

(51) Int. Cl.
*H01M 8/12* (2006.01)
(52) U.S. Cl. .......................... 427/115; 429/535
(58) Field of Classification Search .................. 427/115; 429/253, 527, 535
See application file for complete search history.

(56) References Cited

U.S. PATENT DOCUMENTS

| | | | | |
|---|---|---|---|---|
| 5,431,967 A | | 7/1995 | Manthiram et al. | 427/555 |
| 5,590,383 A | * | 12/1996 | Sekhar et al. | 419/2 |
| 2001/0054379 A1 | * | 12/2001 | Choy et al. | 118/666 |
| 2002/0076608 A1 | * | 6/2002 | Kamisuki et al. | 429/101 |
| 2003/0235738 A1 | * | 12/2003 | Zheng | 429/31 |
| 2004/0038808 A1 | * | 2/2004 | Hampden-Smith et al. | 502/180 |

FOREIGN PATENT DOCUMENTS

| | | |
|---|---|---|
| DE | 19740502 A1 | 3/1999 |
| WO | WO 03/071626 A2 | 8/2003 |
| WO | WO 03/071626 A3 | 8/2003 |

OTHER PUBLICATIONS

Z. Xu et al Materials Research Society Symposium Proc. vol. 778(2003) U6.10.1-U6.10.6.*
International Search Report, PCT/FR2005/051112, 2 pgs, (Jun. 20, 2006).

* cited by examiner

*Primary Examiner* — Michael Cleveland
*Assistant Examiner* — Tabassom Tadayyon Eslami
(74) *Attorney, Agent, or Firm* — Nixon Peabody LLP

(57) ABSTRACT

The invention relates to a method for manufacturing an assembly (1) for a fuel cell comprising at least two adjacent cell components, applied by means of the successive steps consisting of: a) solidifying by laser sintering a powder layer (Ci) deposited beforehand so that it forms a section of the assembly; and b) depositing a successive powder layer on the powder layer (Ci) deposited beforehand and solidified by laser sintering; the steps a) and b) being alternately repeated until the obtained stacked sections form together the assembly comprising at least two components. According to the invention, the method is applied so that at least one of the obtained sections (S1-Sp) has at least two areas with different porosities.

13 Claims, 6 Drawing Sheets

METHOD FOR MANUFACTURING AN ASSEMBLY FOR A FUEL CELL

CROSS REFERENCE TO RELATED APPLICATIONS OR PRIORITY CLAIM

This application is a national phase of International Application No. PCT/FR2005/051112 entitled "Method For Making An Assembly For A Fuel Cell", which was filed on Dec. 20, 2005, which was not published in English, and which claims priority of the French Patent Application No. 04 53212 filed Dec. 23, 2004.

TECHNICAL FIELD

The present invention generally relates to a method for manufacturing an assembly for a fuel cell.

The invention therefore concerns the field of fuel cells, and more particularly but not exclusively, that of fuel cells of the solid oxide type, so-called Solid Oxide Fuel Cells (SOFC).

This type of fuel cells is particularly well adapted to stationary applications and to auxiliary power units.

STATE OF THE PRIOR ART

A fuel cell is conventionally formed by a plurality of stacked fuel cell units, each unit consisting of a sealed plate also called a bipolar plate or interconnector and of a fuel cell elementary cell consisting of a cathode, and electrolyte and an anode, one of the two electrodes being in contact with the sealed plate.

Generally, it is noted that the four constitutive components of a fuel cell unit, i.e., the sealed plate, the cathode, the electrolyte and the anode, are intended to fulfill very specific and different functionalities which condition the selection of the material(s) for their making, as well as the manufacturing technique to be used.

Thus, it is known that the sealed plate, usually used for feeding and discharging the gases between two directly consecutive elementary cells, should be a good dense electronic conductor in order to provide a total seal between the gases present inside the two electrodes separated by this plate. As an indication, the aforementioned sealed plate may also be designed so as to only fulfill the function of a sealed separation of the two electrodes, without providing the feed and discharge of the gases which are then achieved via additional suitable means.

Further, the anode and the cathode should have good electronic conductivity and have sufficiently large porosity in order not to limit access of the gases to the electrolyte.

Finally, the electrolyte should be dense in order to provide a good seal to the gases, and it only has ionic conductivity.

Separately making the elementary cells and the sealed plates is known from the prior art, these plates may be obtained by means of different manufacturing techniques, for example laser sintering as this described in FR-A-2 836 282. Next, one proceeds with assembling them.

Therefore, the major drawback resulting from such a procedure lies in a manufacturing time which is clearly not optimized, and therefore very costly. As an indication, this long manufacturing time not only stems from the significant number of assembling operations to be carried out, but also from the difficulty of performing these operations.

On the other hand, during these assembling operations, the elementary cells and the sealed plates must then be subject to handling operations which risk generating not insignificant deteriorations to the latter, because of their brittleness notably due to their small thickness and to their brittle materials. Of course, any degradation may also lead to significant additional costs.

Finally, it is specified that the assembling of the elements together usually requires the interposition of gaskets and mechanical connection means, which, depending on their quality and on their assembling accuracy, do not inevitably guarantee a sure seal inside the fuel cell during the whole life cycle of the latter.

OBJECT OF THE INVENTION

Therefore, the object of the invention is to propose a method for manufacturing an assembly for a fuel cell, which at least partly remedies the aforementioned drawbacks relating to the achievements of the prior art.

To do this, the object of the invention is a method for manufacturing an assembly for a fuel cell comprising at least two adjacent cell components taken from a cathode, an electrolyte, and anode and a sealed plate.

It is applied by successive steps consisting of:

a) at least partially solidifying, by laser sintering, a layer of powder deposited beforehand, so that it forms a section of the assembly; and b) depositing a successive layer of powder with an identical or different composition, on the layer of powder deposited beforehand and at least partly solidified by laser sintering;

the steps a) and b) being alternately repeated until the obtained stacked sections, made integral with each other upon achievement of the solidification steps by laser sintering, together form the assembly comprising at least two cell components of different nature.

According to the invention, this method is applied so that at least one of the obtained sections has at least two areas of different porosities.

In other words, the method, object of the present invention, is suitable for continuously manufacturing an assembly integrating at least two components of cells by using the laser sintering technique.

Thus, it is clear that manufacturing time is considerably optimized, in the sense that it is not necessary to proceed with an additional mechanical assembling step between the thereby obtained cell components, since the latter are automatically made integral with each other during laser sintering of the layers of powder causing the formation of constitutive sections of the assembly.

Moreover, the number of superimposed powder layers and at least partially sintered after each other may be very large, so it is obvious that the assembly obtained by applying the method according to the invention, may easily include several components of cells, or even a plurality of cell units, or further a fuel cell in its entirety.

The fact that this assembly appears as a stack of interval sections, implies that handling operations of cell components are reduced, the risks of deterioration associated with these handling operations therefore being relatively low. This is notably explained by the reduction in the number of handling operations to be performed, but also by the fact that an operator is most often led to handling cell assemblies consisting of stacked components and not cell unit components, for which the smaller thickness enhances brittleness.

On the other hand, it is not necessary to provide additional mechanical connection means between the cell components of a same assembly, since this mechanical support function is now obtained automatically during the laser sintering, this technique advantageously providing an extremely satisfactory support between the components.

On this account, it is noted that applying the laser sintering technique for making the different sections has many advantages.

Indeed, with this very well mastered technique, it is possible to produce complex geometries at reasonable costs. In this way, it is therefore possible to make assemblies comprising cell components with complex shapes, which are difficult or impossible to obtain with other manufacturing techniques currently used in this field. This may notably be the case for the sealed plate which is capable of integrating channels with complex shapes in order to provide proper distribution of the gases. Generally, this sintering technique finds some advantage as soon as the question is of producing a particular geometry on one of the four cell components. Additionally, this laser sintering technique allows rough surfaces to be made on the components of the assembly, which if necessary provide good adhesion with another cell component, for example belonging to another assembly made according to the method, object of the invention. As an illustrative example, making a rough surface on a sealed plate provides very good adhesion of the electrode which is adjacent to it, and therefore an extremely stiff connection may be obtained between this sealed plate and the elementary cell which is directly consecutive to it.

Moreover, the fact of being able to produce complex geometries provides the possibility of easily contemplating the manufacturing of an assembly provided with a significant number of cell components, such as an assembly including an elementary cell and a sealed plate.

Further, this so-called rapid prototyping technique, controlled by a CAD file in order to obtain maximum precision on the areas of the layers of powder to be solidified, is quite suitable for making an assembly having a composition and non-homogenous porosity in the stacking direction of the sections, as this is the case in fuel cells.

Actually, one particularity of the invention lies in the fact that the possibility is provided for obtaining at least two components of adjacent cells with differing porosity and/or composition, by superimposing layers of powder of different materials, possibly having different compactions before sintering. Therefore, with this laser sintering technique, an assembly may advantageously be made relatively easily, each cell component of which has a composition/porosity adapted to the encountered needs, notably in terms of electronic/ionic conductivity and of seal.

In this respect, it is noted that it is not only possible to provide composition and/or porosity gradients inside an assembly in the stacking direction of the sections, but also, if need be, to provide composition and/or porosity gradients inside a same cell component of this assembly, again along this same stacking direction.

In this respect, it is noted that one particularity of the present invention lies in the fact that the method is applied so that at least one of the obtained sections, intended to enter into the structure of any of the cell components, has at least two areas of different porosities, for example this may be achieved by laser sintering, performed in a non-homogenous way on a same layer powder in the main plane of this layer. More specifically, this specific characteristic may easily be obtained by changing the application conditions for the sintering of this layer (power of the laser, etc.).

With such a possibility, obtaining one or more sections of the assembly may then be contemplated, for example having at least two areas of different porosities, one relatively porous and the other very dense. These areas may therefore be used for producing a porosity gradient in a main plane of this same section. This property may further be used for providing the seal at one portion or at the totality of the free ends of the electrodes which would then be very dense, whereas the central portion of these electrodes would naturally retain sufficiently large porosity so as not to limit access of the gases to the electrolyte. On this account, in addition to the possibility of providing densified sintered areas for providing the seal at the electrodes, it is alternatively possible to provide one or more gaskets, for example glass gaskets, in order to fulfill this seal function.

Finally, it is noted that the laser sintering technique may be applied in any way known to one skilled in the art, in particular as described in document EP-A-1 058 175. In the preferential case when several materials would be used during application of the invention, the device described in this document will then be able to be coupled with a powder dispensing system capable of feeding this device with several powders of different materials.

Preferably, as this has just be mentioned, the method is applied so that at least two of the powder layers have a different composition, of course with the purpose of obtaining cell components with different compositions and/or so that at least one cell component itself has a composition gradient in the stacking direction of the sections. In the latter case, the benefit may lie in the possibility of overcoming the detrimental effects likely to be caused by differences in thermal expansion coefficients of the different materials used within the assembly. However, with this composition gradient within a same cell component, as an illustrative example, the reaction surface may also be increased at the electrode, owing to the three-dimensionality of this reaction surface.

Preferably, the method is applied so that at least two of the powder layers have a different thickness. The powder layers required for forming sections intended to form a particular cell component of the assembly, may actually be caused to have a thickness different from that of the powder layers required for forming sections intended to form another cell component of this assembly. Obviously, here again, the thickness of the layers involved in the formation of a same cell component is also likely to vary depending on the encountered needs.

Further, it may be provided that at least one of the powder layers is compacted before being at least partly solidified by sintering. With this preliminary compaction, it is possible to obtain a section after sintering which is denser than what it would have been if it had not been compacted.

As an illustrative example, compaction may be achieved in an identical or similar way to that discussed in document EP-A-1 058 175, or in any other way known to one skilled in the art.

Still preferentially, the method is applied so that at least two of the obtained sections have different porosity. This feature may be obtained by changing the composition of the powder used, by varying the application conditions of the laser sintering (power of the laser, etc.), by adding a pore-forming material to the powder or to the mixture of powders, and/even by performing preliminary compaction(s) as the one discussed above.

Naturally, with this specificity, it is essentially possible to make an assembly for a cell, for which each of the components of this assembly has the suitable porosity; in this respect, it is recalled that each of the constitutive sections of the cell components itself is likely to have a porosity gradient in its main plane.

It is specified that the specificity according to which two of the obtained sections have different porosity, appears as relatively advantageous in the sense that two adjacent components of a fuel cell are likely to have very different porosity, notably when dealing with an electrode or the electrolyte.

Preferably, the assembly is formed by an anode, an electrolyte, and a cathode, together forming an elementary cell of a fuel cell.

Another possibility lies in the fact of making, again continuously, a so-called fuel cell unit assembly, formed by a sealed plate and an elementary cell of a fuel cell, consisting of an anode, an electrolyte and a cathode. In such a case, the junction between the sealed plate and the elementary cell, directly obtained during the laser sintering, is very satisfactory, advantageously.

Also, the assembly may consist of a plurality of adjacent fuel cell units, each unit consisting of a sealed plate and an elementary cell of a fuel cell, consisting of an anode, an electrolyte and a cathode. In the latter case, it is therefore the whole of the fuel cell which may be obtained continuously, by laser sintering of stacked powder layers.

Naturally, any other association of adjacent cell components may be contemplated.

As an illustrative example, the powder(s) used for making the layers are selected from the group formed by ceramic powders, metal powders, metal alloy powders, metal-ceramic composite powders and mixtures of the aforementioned powders. Moreover, it is noted that organic products may be added to these powders or mixtures of powders.

Finally, it is indicated that the assembly is preferably intended for forming a solid oxide fuel cell (SOFC).

Other advantages et features of the invention will become apparent in the detailed non-limiting description herein below.

BRIEF DESCRIPTION OF THE DRAWINGS

This description will be made with reference to the appended drawings wherein.

DETAILED DESCRIPTION OF PREFERRED EMBODIMENTS

Figure 1A:
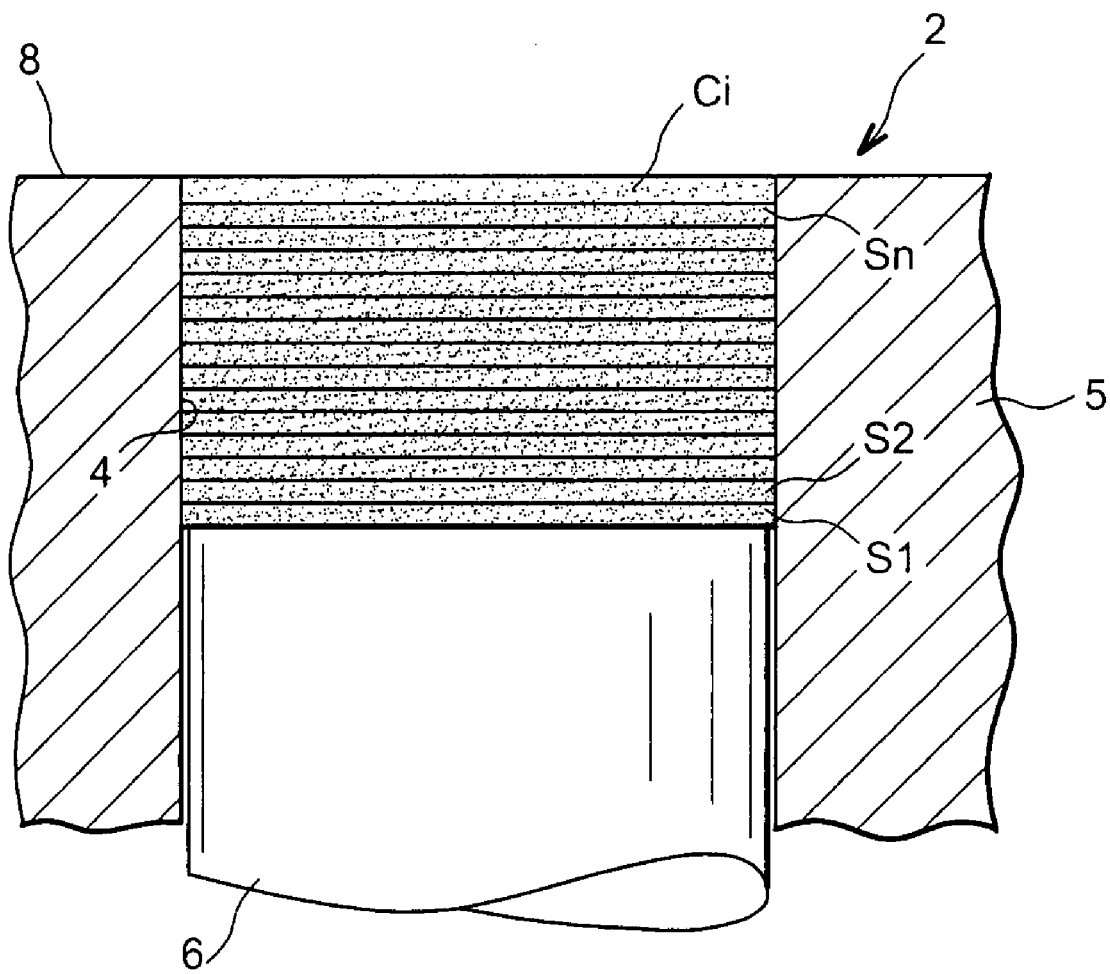
FIGS. 1A-1F illustrate different views schematizing successive steps of a manufacturing method according to a first preferred embodiment of the present invention, this method being applied so as to obtain an assembly formed by an elementary cell of a fuel cell visible in FIG. 1F.
Figure 1B:
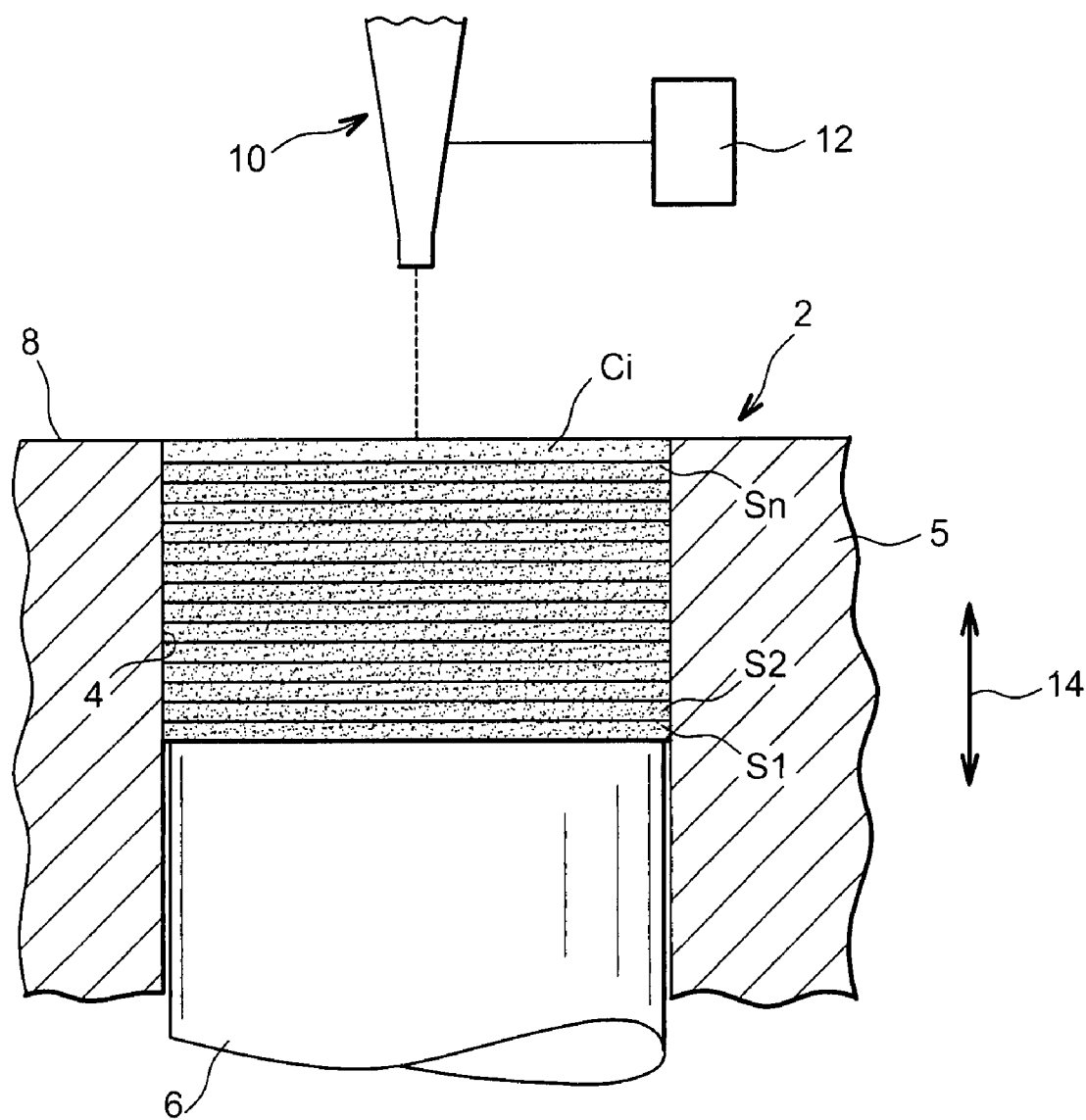
Figure 1C:
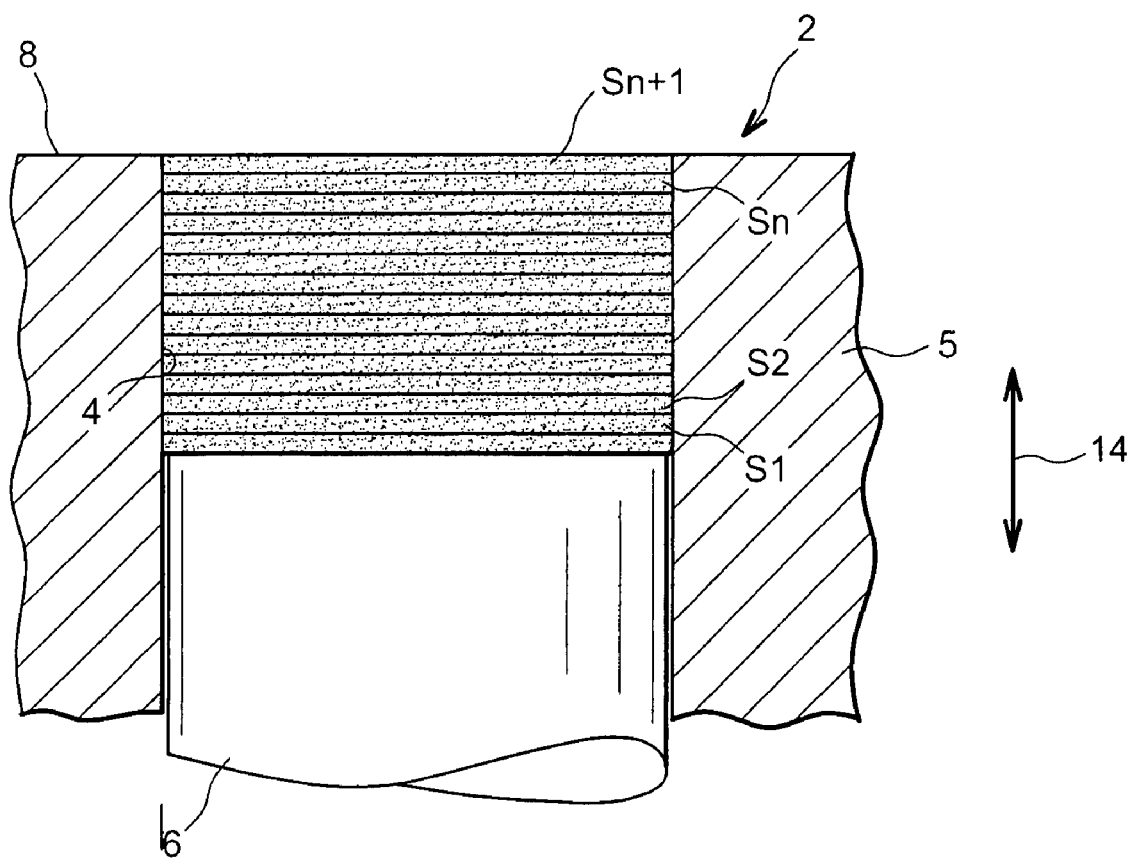
Figure 1D:
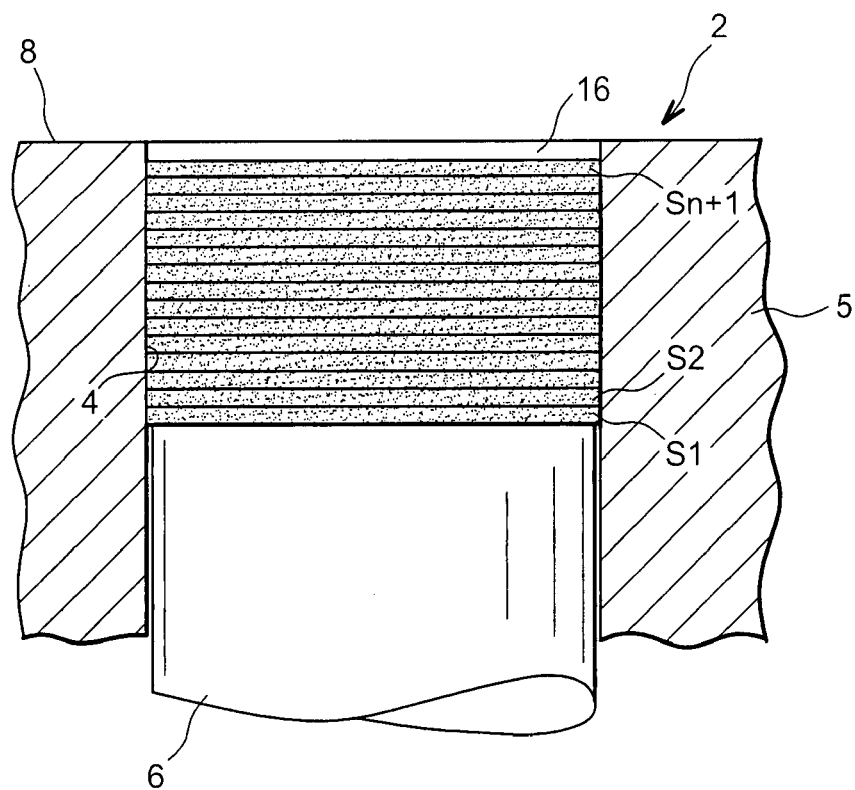
Figure 1E:
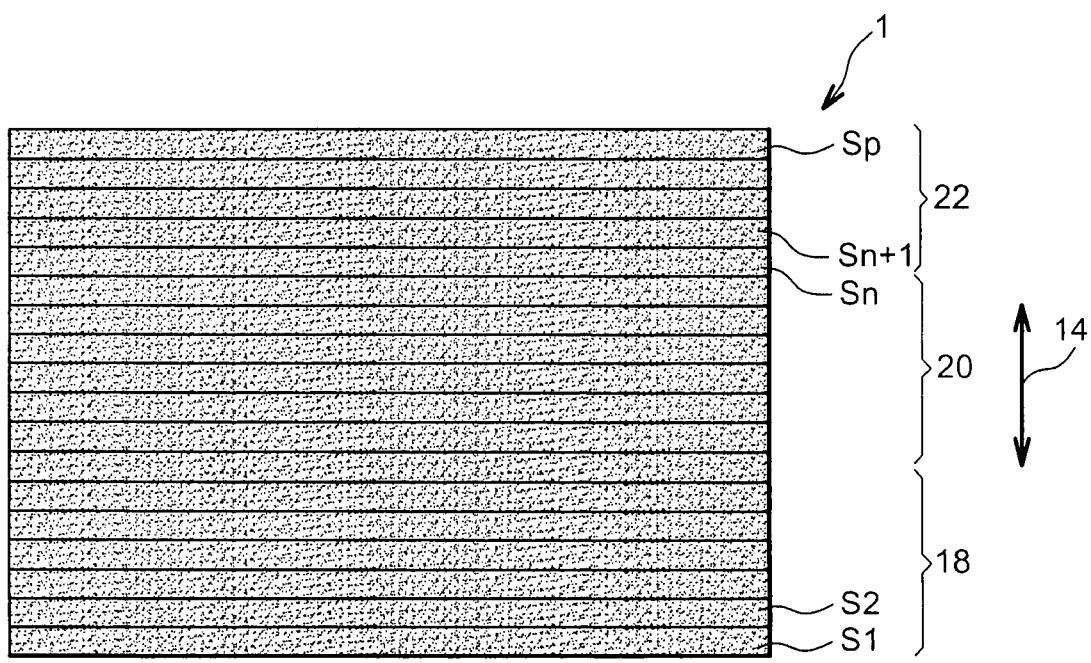
Figure 1F:
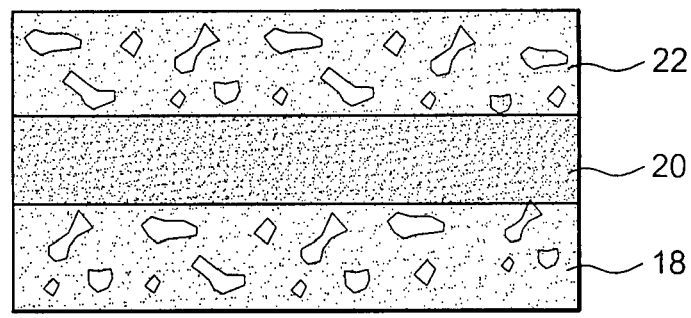

First of all, with reference to FIGS. 1A-1F, different steps of a manufacturing method according to a first preferred embodiment of the present invention are illustrated schematically in chronological order, the purpose of which is to make by laser sintering an assembly 1 for a fuel cell here assuming the shape of an elementary cell of a cell visible in FIG. 1F.

For applying this method, a rapid prototyping device may be used, such as the one described in EP-A-1 058 675, which is incorporated herein by reference. Naturally, any other device known to one skilled in the art and capable of providing laser sintering of powder layers might have been retained, without departing from the scope of the invention.

Globally, this rapid prototyping device 2 partly illustrated in FIG. 1A includes a cylinder 4 provided in a frame 5 and defining a cavity delimited towards the bottom by a piston 6. The cylinder 4 and the assembly 1 capable of being obtained by the method, may of course have any shape known to one skilled in the art, without departing from the scope of the invention.

Inside this cylinder 4, a powder layer Ci may be seen which was deposited on a support based on a powder layer having been deposited beforehand and then at least partly solidified by laser sintering, so as to form a section Sn of the assembly. Thus, it should be understood that the powder layer Ci rests both on the solidified portion of the support formed by the section Sn, and as well as on the possible non-solidified portions of this support assuming the shape of powder residues.

As this may be clearly seen in this FIG. 1A, the powder layer Ci is deposited so as to rest on the upper surface of the support integrating the section Sn, and so that it has an upper surface laid out in a same plane as a work plane 8 defined by the frame 5. As an indication, deposition of this powder layer Ci may be carried out by means of a bevelled roller or a standard roller. (not shown) such as the one described in EP-A-1 058 675, the retained powder may then come from a powder dispensing system (not shown) capable of feeding this device 2 with several powders of different materials. In such a case, this system for dispensing powders of different materials would then be substituted for the second cylinder of the device described in EP-A-1 058 675, forming a single powder tank.

Still as an indication, once the layer Ci is deposited and occupies the whole of the space which is allocated to it in the upper portion of the cylinder 4, this layer Ci may, if necessary, undergo compaction in order to increase the density before sintering, this compaction is for example applied by means of a roller as described in EP-A-1 058 675, or by means of any other technique known to one skilled in the art.

The powder layer Ci, for which the compactness before sintering, the thickness and the constitutive material(s) are determined according to the nature of the section which one desires to obtain, is then subject to at least a partial solidification step by laser sintering, preferably by means of a laser source 10 as schematically illustrated in FIG. 1B.

This laser source 10 is controlled by computer means 12 including a CAD file, with which it is possible to accurately solidify only the intended portions of the layer of powder Ci, the other portions of this layer therefore remaining in a powdery condition. Of course, the solidified portions of the layer Ci are determined according to the characteristics of the section which one desires to obtain, which, as for it, is intended to subsequently form a portion of one of the cell components of the assembly 1. Consequently, it should be understood that the layer Ci might naturally be caused to be entirely solidified by laser sintering, without leaving any powder residue.

Further, it is recalled that the possibility of varying the laser sintering parameters (power, rate, laser scanning, etc.) is another means capable of influencing the final porosity of the section obtained by laser sintering.

It is also noted that this solidification step by sintering is applied so that the portions to be solidified of the layer Ci solidify at the same time as they become integral with the section Sn of the support.

As an indication, the powder of the layer Ci may be maintained at a given temperature before sintering, for example at most 900° C., in order to increase the rapidity of this solidification step, and with the purpose of reducing the energy which should be provided by the laser source 10.

Once the solidification of the layer Ci is completed, the latter then assumes the shape of a section Sn+1 of the assembly possibly accompanied by powder residues, as this is schematically seen in FIG. 1C.

The cavity defined by the cylinder 4 is then filled with a plurality of sections S1, S2 . . . to Sn+1 which are stacked along a stacking direction of the sections 14, parallel to a displacement direction (not referenced) of the piston 6, and which have all been successively made by laser sintering, based on a powder layer with wisely determined characteristics (composition, thickness, compaction before sintering, etc.). Further, these solid sections S1, S2 . . . to Sn+1 are made integral with each other, and are possibly associated with non-solidified remaining portions always appearing in a powdery condition.

Application of the method is continued by lowering the piston 6 by a distance equal to the thickness of the following powder layer Ci+1 (not shown) which one wishes to deposit, as this is visible in FIG. 1D. Actually, lowering of piston 6 results in freeing a space 16 at the upper portion of the cylinder 4, in which the aforementioned layer Ci+1 may be deposited, a layer itself intended to undergo solidification by laser sintering.

Thus, these laser sintering solidification and successive powder layer deposition steps are alternately repeated as many times as necessary, until a number <<p>> of sections is obtained, forming together the assembly 1 provided with three cell components 18, 20 and 22.

In FIG. 1E, the assembly 1 extracted from the cylinder 4 and provided with sections S1, S2 . . . to Sp is illustrated in a configuration which is still not final, as it appears as a block integrating not only the sections indicated above, but also possible powder residues corresponding to the non-solidified portions during the sintering operations.

For this reason, in order to obtain the elementary cell of a fuel cell as illustrated in FIG. 1F and also indicated by the reference number 1, one proceeds with removing these powder residues, for example by simply evacuating powder grains which may be easily extracted from the block. Once this step is achieved, the anode 18, the electrolyte 20, as well as the cathode 22 of this elementary cell or assembly 1, are then seen to appear, which may globally have a composition gradient as well as a porosity gradient in the stacking direction 14. As indicated earlier, it is each of the cell components 18, 20, 22, which may have composition and porosity gradients in this same stacking direction.

Still as an indicative example, it is specified that carrying out a heat treatment in an oven of this assembly 1 and/or laser re-melting may be contemplated during the making of the layer to be treated, with the purpose of improving densification of certain sections, such as those intended to form the electrolyte, and possibly those intended to form the sealed plate when the latter should be an integral portion of the assembly appearing as a single piece and being obtained continuously by means of the rapid prototyping device 2.

In this respect, even if this is not illustrated in FIGS. 1A-1F, it is noted that one of the specificities of the present invention lies in the fact of obtaining one section having at least two areas of different porosities, this being for example achieved by changing the sintering parameters during the solidification by sintering of a given powder layer. These different areas, provided on section(s) intended to form any of the cell components, depending on the encountered needs, may then be used for producing a porosity gradient in a main plane of the relevant section.

Figure 2:
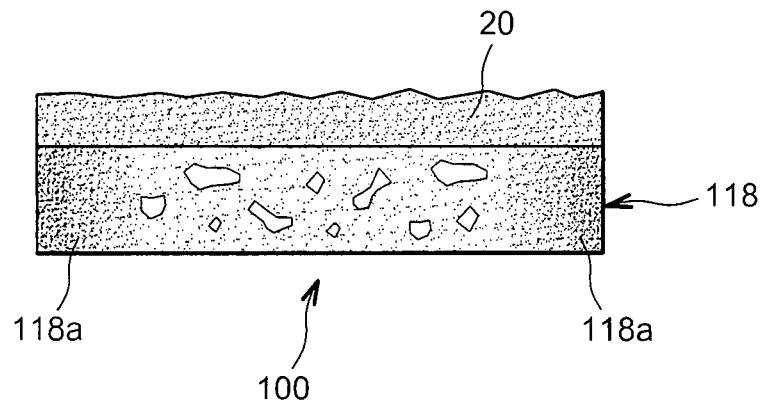
FIG. 2 is partial view similar to that of FIG. 1F, illustrating a portion of an elementary cell of a fuel cell capable of being obtained during the application of a second preferred embodiment of the method, object of the present invention.

Now, with reference to FIG. 2, a portion of an assembly or a fuel cell elementary cell 100 may be seen, which may be obtained upon applying a second preferred embodiment of the present invention which is a specific application of the first embodiment described above.

Indeed, in order to obtain this cell 100, the method used is similar to the one discussed above, the specificity lying here in the making of two constitutive sections of the anode 118 having at least two areas of different porosities, for example so as to form a porosity gradient in a main plane of this section. This possibility of having areas with different porosities, also provided at the cathode (not shown in FIG. 2) and/or at the electrolyte 20, is essentially used for providing the seal at one portion or at the whole of the free ends 118a of the anode 118, which would then be very dense. Actually, when each constitutive section of the anode is made so as to have a relatively porous central portion and very dense end(s), the latter are then the ones which together form the very dense free ends 118a of the anode 118. Thus, generally, during sintering of each section intended for forming an electrode, laser sintering is carried out so as to obtain at least one end area, densified relatively to a central area.

It is also specified that when the assembly is intended to have a circular section, each electrode then has a single free end as an annular portion partly or entirely densified in order to provide the seal.

Figure 3:
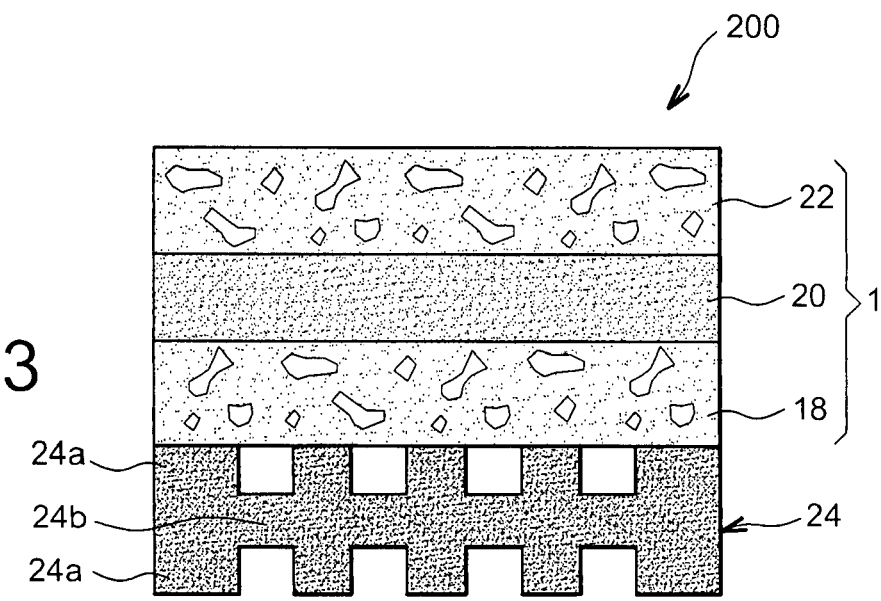
FIG. 3 illustrates a view of a fuel cell unit capable of being obtained during the application of a third preferred embodiment of the method, object of the present invention.

With reference to FIG. 3, a fuel cell assembly or unit 200 may be seen, capable of being obtained continuously during the application of a third preferred embodiment of the present invention.

Thus, in order to apply this third embodiment, the number of powder layers to be deposited and then sintered, may be increased, relatively to that encountered in the first embodiment, since the sections made integral with each other and appearing as a single piece should not only form the elementary cell 1, 100, but also a sealed plate 24.

On this account, it is specified that the sealed plate 24 may be made integral with the anode 18 or with the cathode 22 indifferently. Moreover, the characteristics of the formed sections based on sintered powder layers and forming this sealed plate 24 are notably determined according to functionalities associated with this plate. Indeed, the latter may have the role of providing the feed and discharge of the gases of either side of a sealed central portion 24a (case illustrated in FIG. 3). To do this, the plate 24 in a known way, then has two areas 24b with channels of complex shapes laid out on each side of the sealed portion 24a. However, the cases when this sealed plate would be provided with a single area intended to be crossed by the gases or even only provided with a sealed portion, are also covered by the present invention. In this respect, it is noted that these sealed plates are usually called bipolar plates or interconnectors.

Of course, in this third embodiment, provision is also made for obtaining at least one section having at least two areas with different porosities, this being for example achieved by changing the sintering parameters during the solidification by sintering on a given powder layer.

Figure 4:
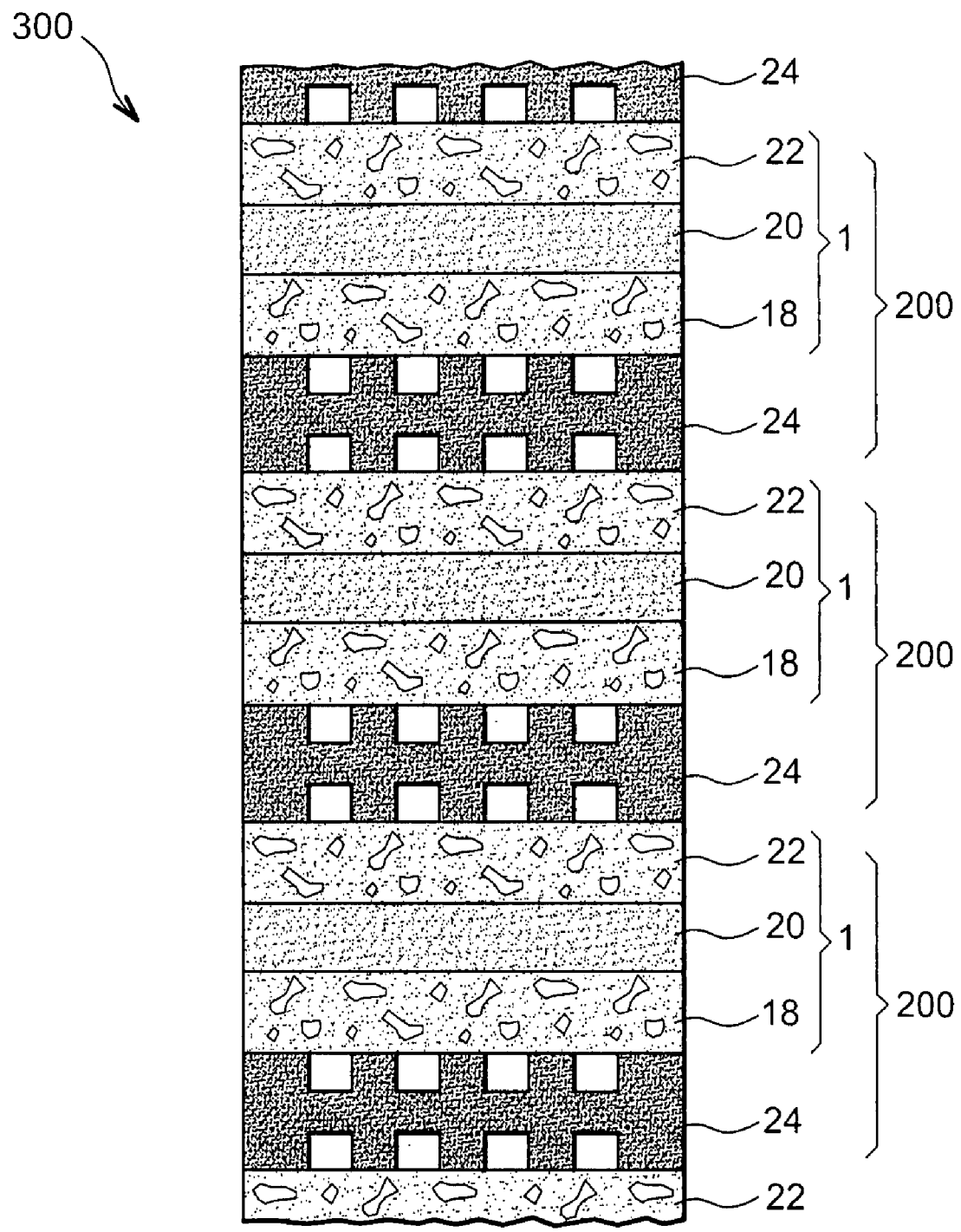
FIG. 4 illustrates a view of a plurality of adjacent fuel cell units capable of being obtained together during the application of a fourth preferred embodiment of the method, object of the present invention.

Finally, with reference to FIG. 4, a plurality of adjacent units of a fuel cell or an assembly 300 may be seen, capable of being obtained continuously during the application of a fourth preferred embodiment of the present invention.

In this fourth preferred embodiment, manufacturing an assembly 300 as a single piece is therefore contemplated, consisting of several cell units 200 stacked in the stacking direction of the sections, as the one visible in FIG. 3. Consequently, by repeating as many times as necessary, deposition of powder layers and their sintering, it is therefore advantageously possible to end up with a stack of components forming the whole of the fuel cell.

As this has been described above, in all the preferred embodiments, it is important to note that the seal of the assembly, mainly at the electrodes, is preferentially provided during the manufacturing of this assembly, preferably by densifying one area/end areas of these electrodes, and/or even by adding a glass gasket (not shown).

Exemplary Embodiment

Anode:
  composition: cermet: nickel, yttriated zirconia
  porosity: between about 10 and 50%
  thickness: between about 20 and 50 μm
Electrolyte:
  composition: yttriated zirconia
  porosity: less than about 5%
  thickness: between about 20 and 100 μm
Cathode:
  composition: lanthanum manganite doped with strontium
  porosity: between about 10 and 50%
  thickness: between about 20 and 50 μm
Sealed Plate (Interconnector):
  composition: lanthanum chromite
  porosity: less than about 5%
  thickness: between about 10 and about 5 mm
Number of powder layers per cell component of the assembly: about 1 to 10 μm Of course, various changes may be made by one skilled in the art to the manufacturing method which has just been described only as a non-limiting example.

The invention claimed is:

1. A method for manufacturing an assembly (1, 100, 200, 300) for a fuel cell comprising at least two adjacent cell components taken from a cathode (22), and anode (18, 118), an electrolyte (20) and a sealed plate (24), said method being applied by means of successive steps consisting of:
  a) at least partially solidifying, by laser sintering, a powder layer ($C_i$) deposited beforehand so that it forms a section ($S_{n+1}$) of the assembly; and
  b) depositing a successive powder layer ($C_{i+1}$) on the powder layer ($C_i$) deposited beforehand, and at least partially solidified by laser sintering;
  steps a) and b) being alternately repeated until the obtained stacked sections ($S_1$-$S_p$), made integral with each other during the carrying out of the solidification steps by laser sintering, form together the assembly comprising at least two cell components (18, 118, 20, 22, 24),
  characterized in that it is applied so that at least one of the obtained sections ($S_1$-$S_p$) has at least two areas with different porosities in the main plane of said obtained section ($S_1$-$S_p$), and at least two of the powder layers ($C_i$, $C_{i+1}$) have a different thickness.

2. The method for manufacturing an assembly (1, 100, 200, 300) for a fuel cell according to claim 1, characterized in that it is applied so that at least two of the powder layers ($C_i$, $C_{i+1}$) have a different composition.

3. The method for manufacturing an assembly (1, 100, 200, 300) for a fuel cell according to claim 1, characterized in that at least one of the powder layers ($C_i$, $C_{i+1}$) is compacted before being at least partially solidified by laser sintering.

4. The method for manufacturing an assembly (1, 100) for a fuel cell according to claim 1, characterized in that this assembly is formed by an anode (18, 118), and electrolyte (20) and a cathode (22), forming together an elementary cell of a fuel cell.

5. The method for manufacturing an assembly (200) for a fuel cell according to claim 1, characterized in that this assembly is formed by a sealed plate (24) and an elementary cell of a fuel cell consisting of an anode (18, 118), an electrolyte (20) and a cathode (22).

6. The method for manufacturing an assembly (300) for a fuel cell according to claim 1, characterized in that this assembly is formed by a plurality of adjacent fuel cell units (200), each unit consisting of a sealed plate (24) and of an elementary cell of a fuel cell, consisting of an anode (18, 118), an electrolyte (20) and a cathode (22).

7. The method for manufacturing an assembly (1, 100, 200, 300) for a fuel cell according to claim 1, characterized in that the powder(s) used for making the layers ($C_i$, $C_{i+1}$) are selected from the group formed by ceramic powders, metal powders, metal alloy powders, ceramic-metal composite powders and mixtures of the aforementioned powders.

8. The method for manufacturing an assembly (1, 100, 200, 300) for a fuel cell according to claim 7, characterized in that organic products are added to the powder(s) used for making the layers ($C_i$, $C_{i+1}$).

9. The method for manufacturing an assembly (1, 100, 200, 300) for a fuel cell according claim 1, characterized in that the assembly is intended to form a solid oxide fuel cell (SOFC).

10. The method for manufacturing an assembly according to claim 1, characterized in that: the at least two areas with different porosities form a porosity gradient in the main plane of said obtained section ($S_1$-$S_p$).

11. The method for manufacturing an assembly (1, 100, 200, 300) for a fuel cell according to claim 1, characterized in that it is applied so that at least two of the obtained sections ($S_1$-$S_p$) have different porosity.

12. The method for manufacturing an assembly (200) for a fuel cell according to claim 11, characterized in that this assembly is formed by a sealed plate (24) and an elementary cell of a fuel cell consisting of an anode (18, 118), an electrolyte (20) and a cathode (22).

13. The method for manufacturing an assembly (300) for a fuel cell according to claim 11, characterized in that this assembly is formed by a plurality of adjacent fuel cell units (200), each unit consisting of a sealed plate (24) and of an elementary cell of a fuel cell, consisting of an anode (18, 118), an electrolyte (20) and a cathode (22).

* * * * *